United States Patent
Bohra et al.

(10) Patent No.: US 9,984,070 B2
(45) Date of Patent: *May 29, 2018

(54) GENERATING LANGUAGE SECTIONS FROM TABULAR DATA

(71) Applicant: International Business Machines Corporation, Armonk, NY (US)

(72) Inventors: Amit P. Bohra, Pune (IN); Krishna Kummamuru, Bangalore (IN); Alexander Pikovsky, Lexington, MA (US); Swapnasarit Sahu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 14/469,747

(22) Filed: Aug. 27, 2014

(65) Prior Publication Data

US 2015/0363363 A1 Dec. 17, 2015

Related U.S. Application Data

(63) Continuation of application No. 14/303,656, filed on Jun. 13, 2014.

(51) Int. Cl.
*G06F 17/27* (2006.01)
*G06F 17/28* (2006.01)
(Continued)

(52) U.S. Cl.
CPC .............. *G06F 17/28* (2013.01); *G06F 17/27* (2013.01); *G06F 17/2785* (2013.01);
(Continued)

(58) Field of Classification Search
CPC ...... G06F 17/21; G06F 17/211; G06F 17/245; G06F 17/2881
(Continued)

(56) References Cited

U.S. PATENT DOCUMENTS 7,143,026 B2 * 11/2006 Challenger ....... G06F 17/30914
704/2
7,792,829 B2 9/2010 Brill et al.
(Continued)

OTHER PUBLICATIONS

Buitelaar et al., "Ontology-based information extraction and integration from heterogeneous data sources", International Journal of Human-Computer Studies, Nov. 2008, pp. 759-788, vol. 66, Issue 11 Copyright © 2008 Elsevier Ltd. http://www.sciencedirect.com/science/article/pii/S1071581908000906.
(Continued)

*Primary Examiner* — Forrest F Tzeng
(74) *Attorney, Agent, or Firm* — Peter J. Edwards

(57) ABSTRACT

A computer implemented method of generating a language section from tabular data in an electronic document may include identifying, in a first tabular portion of the electronic document, a set of categories used to organize tabular data. The method may include identifying a content characteristic for each category of the set of categories in the first tabular portion. And the method may include generating a first language section from at least two distinct categories of the set of categories, wherein a format of the first language section is based on the content characteristics for the at least two distinct categories.

14 Claims, 10 Drawing Sheets

| | Tabular Data | | | OUTPUT TYPE | Language Section | |
|---|---|---|---|---|---|---|
| | Column Label (CL) | Row Label (RL) | Content Cell (CC) | | Section Title | Section Paragraph |
| 424 | Words | Words | Words | Sentence | N/A | Sentence (CL,RL,CC) |
| 426 | Words | Words | Sentence | Section | Sentence (CL, RL) | CC |
| 428 | Sentence | Words | Sentence | Section | Sentence (focus(CL), RL) | Section (CL, RL, CC) |
| 430 | Words | Sentence | Sentence | Section | Sentence (CL, focus(RL)) | Section (RL, CC) |
| 432 | Sentence | Sentence | Sentence | Section | Sentence (CL, RL) | Section (CL, RL, CC) |
| 434 | Words | Words | Image | Sentence | N/A | Sentence (CL, RL, Image to text(CC)) |
| 436 | Image | Image | Words | Sentence | N/A | Sentence (Image to text(CL), Image to text(RL), CC) |

422

(51) Int. Cl.
*G06F 17/24* (2006.01)
*G06F 17/21* (2006.01)

(52) U.S. Cl.
CPC .......... *G06F 17/2881* (2013.01); *G06F 17/21* (2013.01); *G06F 17/211* (2013.01); *G06F 17/245* (2013.01)

(58) Field of Classification Search
USPC .............................................. 715/249; 704/9
See application file for complete search history.

(56) References Cited

U.S. PATENT DOCUMENTS

| | | | |
|---|---|---|---|
| 8,565,526 B2 | 10/2013 | Bayer et al. | |
| 8,914,419 B2 | 12/2014 | Gerard et al. | |
| 9,042,653 B2* | 5/2015 | Lin | G06F 17/30253 |
| | | | 382/181 |
| 2003/0229854 A1 | 12/2003 | Lemay | |
| 2004/0117739 A1* | 6/2004 | Challenger | G06F 17/30914 |
| | | | 715/251 |
| 2006/0173834 A1* | 8/2006 | Brill | G06F 17/30554 |
| 2006/0218186 A1* | 9/2006 | Bagheri | G06F 17/30017 |
| 2009/0222718 A1 | 9/2009 | Wagner et al. | |
| 2011/0301941 A1 | 12/2011 | De Vocht | |
| 2013/0185050 A1* | 7/2013 | Bird | G06F 17/30654 |
| | | | 704/2 |
| 2014/0122535 A1 | 5/2014 | Gerard et al. | |
| 2014/0281935 A1* | 9/2014 | Byron | G06F 17/245 |
| | | | 715/249 |
| 2014/0369602 A1* | 12/2014 | Meier | G06K 9/00463 |
| | | | 382/182 |

OTHER PUBLICATIONS

Byron et al., "Discovering Title Information for Structured Data in a Document", U.S. Appl. No. 13/778,901, filed Mar. 29, 2013.
Sadh et al., "Extraction of Relevant Figures and Tables for Multi-document Summarization", Computational Linguistics and Intelligent Text Processing Lecture Notes in Computer Science, 2012, pp. 402-413, vol. 7182, © Springer-Verlag, Berlin Heidelberg DOI: 10.1007/978-3-642-28601-8_34.
Byron et al., "Adapting Tabular Data for Narration", U.S. Appl. No. 13/838,130, filed Mar. 15, 2013.
Byron et al., "Adapting Tabular Data for Narration", U.S. Appl. No. 14/089,953, filed Nov. 26, 2013.
Bohra et al., "Generating Language Sections from Tabular Data", U.S. Appl. No. 14/303,656, filed Jun. 13, 2014.
List of IBM Patents or Patent Applications Treated as Related.

* cited by examiner

FIG. 3

Relocation Policy - Employee Transfers
Objective: This policy outlines the benefits employees would be entitled for in cases of employee transfers. This policy also addresses the benefits available to employees proceeding on or returning from an international assignment.

Employee Transfers
In case of employee initiated transfers, the employees would get at least the following benefits: Airfare (For Self Only)

| Heads of Expenditure 304 | Full-Time Employees 312 | Part-Time Employees 314 | Documents 316 |
|---|---|---|---|
| Preliminary Trip (7 days) 306 | Governed by the domestic travel policy for the following components – Travel, Accommodation, and local conveyance is granted on need basis with prior approval from reporting manager to make schooling/housing arrangements. 320 | Governed by the domestic travel policy for the following components – Travel, Accommodation, and local conveyance is granted on need basis with prior approval from reporting manager to make schooling/housing arrangements. 322 | 1. Copy of Transfer letter; 2. Manager's written approval; 3. Documentation as per the Domestic Travel policy. 324 |
| Hotel/Guest House Stay 308 | As per domestic travel policy 326 | As per domestic travel policy 328 | 1. Copy of Transfer letter; 2. Hotel invoice. 330 |
| Relocation Travel 310 | Economy Class Air. If an employee desires to drive to the new location in his/her own car, reimbursement will be made. Toll and Parking can be claimed based on receipts. 332 | Economy Class Air. If an employee desires to drive to the new location in his/her own car, reimbursement will be made. Toll and Parking can be claimed based on receipts. 334 | 1. Copy of transfer letter; 2. Invoice for air travel tickets; 3. Boarding pass if corporate card not used for air tickets; 4. Manager's approval mail for self driving with the dates of the travel. 336 |

300
302

GENERATING LANGUAGE SECTIONS FROM TABULAR DATA

BACKGROUND

The present disclosure relates to generating a language section from tabular data in an electronic document.

Natural language processing (NLP) applications, question and answer (Q&A) creation systems and the like, utilize analysis of textual content of electronic documents to perform their various functions, such as answering questions and producing conclusions based on the textual content. While these systems may typically work with textual content, in some electronic documents, information may be presented as arranged in a table. NLP and Q&A applications may have difficulty processing information contained in the table.

SUMMARY

According to embodiments of the present disclosure, a computer implemented method of generating a language section from tabular data in an electronic document may include identifying, in a first tabular portion of the electronic document, a set of categories used to organize tabular data. The method may include identifying a content characteristic for each category of the set of categories in the first tabular portion. The method may also include generating a first language section from at least two distinct categories of the set of categories, wherein a format of the first language section is based on the content characteristics for the at least two distinct categories.

Generating the first language section from at least two distinct categories of the set of categories may include generating the first language section from a column label, a row label, and a content cell. The format of the first language section may be based on the content characteristics of the column label, row label, and content cell. The first language section may include a first section title and the method may further include generating the first section title from at least two distinct categories of the set of categories. The format of the first section title may be based on the content characteristics for the at least two distinct categories of the set of categories. Generating the first section title from at least two distinct categories of the set of categories includes generating the first section title from a column label and a row label, the format of the first section title based on the content characteristics of the column label and row label. Identifying the content characteristics for the set of categories may include identifying whether the set of categories is one or more words, one or more sentences, or an image.

The method may include identifying, in a second tabular portion of the electronic document, the set of categories used to organize data. The method may include identifying the content characteristic for each category of the set of categories in the second tabular portion. The method may include generating a second language section from at least two distinct categories of the set of categories, the format of the second language section based on the content characteristics for the at least two distinct categories of the set of categories. And the method may include merging the first language section and the second language section in response to determining that the first language section is substantially similar to the second language section.

The first language section may include a first section title and the second language section may include a second section title and the method may further include generating the second section title from at least two distinct categories of the set of categories, a format of the second section title based on the content characteristics for the at least two distinct categories of the set of categories. The method may further include combining the first section title and the second section title in response to determining that the first language section is substantially similar to the second language section.

The set of categories may include a content cell that includes an image, and identifying a content characteristic for each category of the set of categories may further include determining whether the image contains a representation of an alphanumeric character. Identifying a content characteristic for each category of the set of categories may further include determining whether the image contains a representation of an object, and generating text from the image in response to determining that the image contains an alphanumeric character. Identifying a content characteristic for each category of the set of categories may further include determining that the representation of the object corresponds with an image stored in a memory in response to determining that the image contains a representation of an object, the image stored in the memory having associated text that describes the stored image. Generating of the first language section from at least two distinct categories of the set of categories may further include generating the first language section from the text generated from the representation of the alphanumeric character of the image. The generating of the first language section from at least two distinct categories of the set of categories may further include generating the first language section from the text associated with a stored image that corresponds with the representation of the object of the image.

A computer program product for generating a language section from tabular data in a electronic document, the computer program product comprising a computer readable storage medium having program instructions embodied therewith, the program instructions executable by a computer to cause the computer to perform a method including identifying, in a first tabular portion of the electronic document, a set of categories used to organize tabular data. The method may include identifying a content characteristic for each of the set of categories in the first tabular portion. The method may include generating a first language section from at least two distinct categories of the set of categories, wherein a format of the first language section is based on the content characteristics for the at least two distinct categories of the set of categories.

A data processing system for generating a language section from tabular data in an electronic document, the data processing system may include a storage device including a storage medium, wherein the storage device stores computer usable program code. The system may include a processor, wherein the processor executes the computer usable program code. The computer usable program code may include computer program code for identifying, in a first tabular portion of the electronic document, a set of categories used to organize tabular data. The computer usable program code may include computer program code for identifying a content characteristic for each of the set of categories in the first tabular portion. The computer usable program code may include computer program code for generating a first language section from at least two distinct categories of the set of categories, wherein a format of the first language section is based on the content characteristics for the at least two distinct categories of the set of categories.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 depicts a table containing tabular data which may be converted into natural language form by embodiments of the present disclosure.

Figure 1:
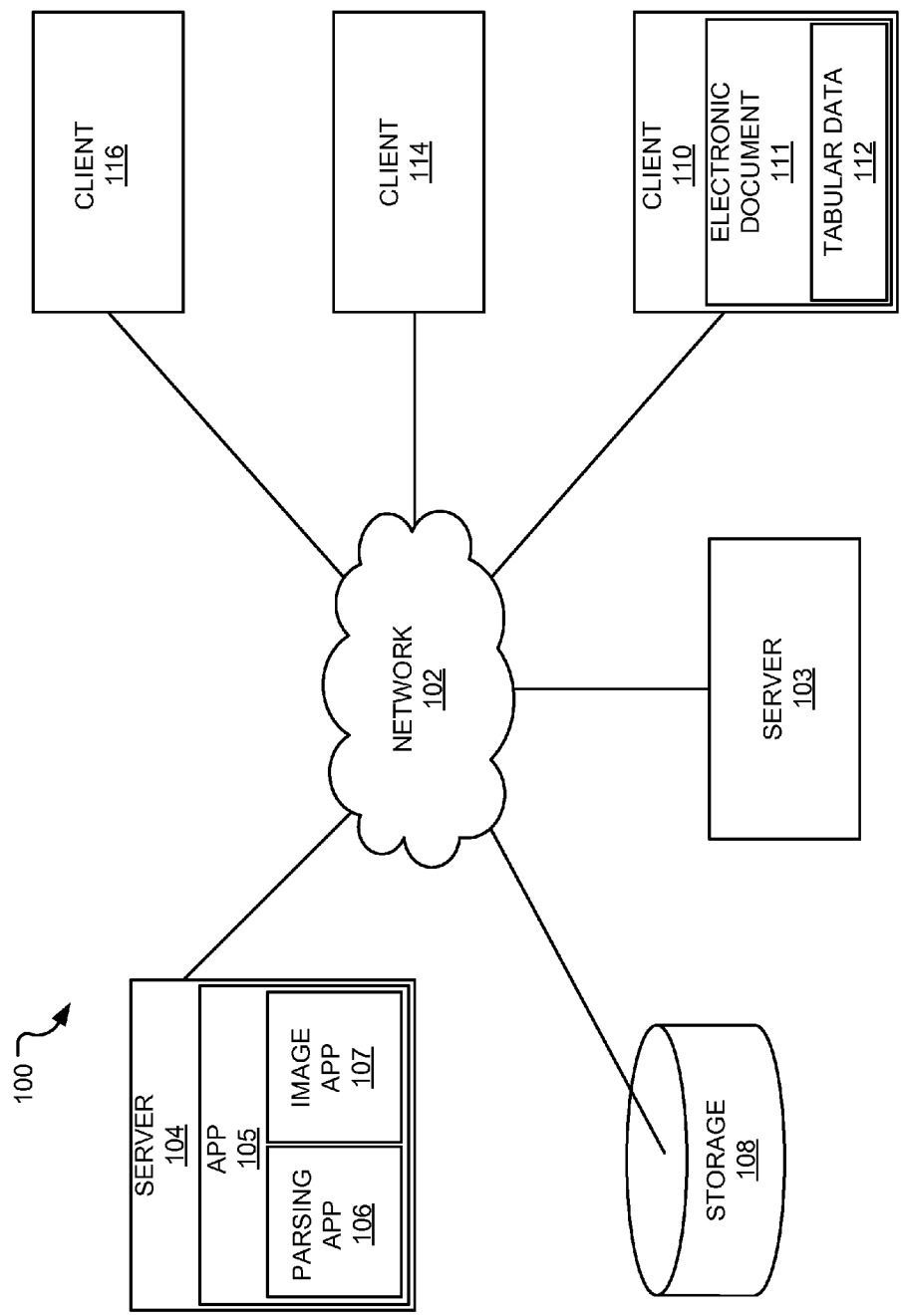
FIG. 1 depicts a pictorial representation of a network of data processing systems in which various embodiments may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to generating a language section from tabular data in a document. While the present disclosure is not necessarily limited to such applications, various aspects of the disclosure may be appreciated through a discussion of various examples using this context.

While the same nomenclature and same numbers may be used to identify elements throughout the disclosure, this practice is not intended to limit the scope of the disclosure. Identified elements in one figure may not be identical to other same named or identified elements in other figures.

Embodiments of the present disclosure are directed toward a computer implemented method of generating a language section from tabular data in a document. Natural language processing (NLP) applications, question and answer (Q&A) creation systems and the like, utilize analysis of textual content of electronic documents to perform their various functions, such as answering questions and producing conclusions based on the textual content. While these systems may typically work with textual content, in some electronic documents, information may be presented as arranged in a table. NLP and Q&A applications may have difficulty in processing information contained in the table.

A method of generating a language section from tabular data in a document may include identifying, in a first tabular portion of the document, a set of categories used to organize data. The method may include identifying a content characteristic for each of the set of categories in the first tabular portion. The method may include generating a first language section from at least two distinct categories of the set of categories, the format of the first language section based on the content characteristics for the at least two distinct categories of the set of categories. This may be particularly useful for parsing natural language from documents which contain tabular data.

In embodiments, a language section is an assembly of language data components from different parts of a document. The language section may capture the different language data components from the document and assemble them as a whole. For example, in embodiments a language section includes both a section paragraph and a section title. The section paragraph may hold the majority of information for a reader. The section title may identify the content in the section paragraph and bring context to the information contained in the section paragraph.

Documents may contain language data in various formats and arrangements, such as language data arranged in a table. When arranged in a table, the language data may be referred to as tabular data. Tabular data may require specialized processing or handling to be interpreted correctly and completely. For example, tabular data positioned in cells in a table may be referenced using the cell data, the cell row position and the cell column position in the table. Referencing the cell data without reference to the cell's position may be insufficient to gain an understanding of the significance of the cell data. As a consequence of the format of the table, each cell may have contextual information in addition to purely the cell data in each cell. The contextual information may not be explicitly mentioned in the cell, but may be expressed in terms of visual layout or the cell's position in the table.

By converting tables into textual information, with reference to the relationship between the cell-value and the organizational structure of the table in which it appears, this contextual information may be captured. As an example, cell-value "61,050" may mean the number sixty one thousand and fifty if considered in isolation from the structure of the table in which the cell-value appears. However, knowing that the cell-value "61,050" appears in the classification of "Revenues," sub-classification of "Taxes," and in the "General" category, in a table that pertains to the finances of "Jefferson County" informs that the general taxes portion of the revenue of Jefferson County is sixty one thousand and fifty Dollars.

Natural language processing (NLP) engines may be used to generate language sections which structure the cell-values, in natural language form, along with the contextual information gained from the inter-relationships among the values of descriptive cells, such as headers or table headings. Generally, the language section generated by embodiments of the disclosure is not limited to one or more isolated data cell values, but may also include natural language sentences exposing the contextual information of the cell value gleaned from the position of the cell value in the table.

The embodiments may identify the organization, or structure used for organizing tabular data in a document. The embodiments may use a combination of heuristics and machine learning, including but not limited to using the formatting or visual arrangement of the tabular data to transform tabular data into a language section.

Referring now to FIG. 1, a pictorial representation of a network of data processing systems may be seen in which embodiments may be implemented. Data processing environment 100 may include network 102. Network 102 may be the medium used to provide communications links between various devices and computers connected together within data processing environment 100. Network 102 may include multiple connections for communication links such as wire, wireless communication links, fiber optic links, or other suitable connections. Server 104 and server 103 may couple to network 102 along with storage 108. In addition, clients 110, 114, and 116 may couple to network 102, servers 103, 104, and storage 108. Clients 110, 114, 116 may be, for example, personal computers or network computers. A data processing system, such as server 103, 104, or client 110, 114, 116 may contain data and may have software applications or software tools which may be executed thereon.

Data processing environment 100 may be used for implementing a client-server environment in which embodiments may be implemented. A client-server environment may enable software applications and data to be distributed across the network 102 such that an application functions by using the interactivity between a client data processing system and a server data processing system. Data processing environment 100 may also employ a service oriented architecture where interoperable software components may be distributed across the network 102 as an application. In embodiments, the network 102 in the data processing environment 100 may be implemented as a number of different types of networks, such as an intranet, a local area network (LAN), wide area network (WAN), or other suitable type of network 102. In certain embodiments, network 102 may represent a collection of networks and gateways that use the Transmission Control Protocol/Internet Protocol (TCP/IP) or other protocols to communicate with one another. However, FIG. 1 is intended as an example, and not as an architectural limitation for embodiments described herein.

In the depicted example, server 104 may provide data, such as boot files, operating system images, and applications to clients 110, 114, 116. Clients 110, 114, 116 may be clients to server 104 in this example. Clients 110, 114, 116, or some combination thereof, may include their own data, boot files, operating system images, and applications. Data processing environment 100 may include additional servers, clients, and other devices.

Application 105 in server 104 may be an implementation of embodiments described herein. The application 105 may be, for example, an existing application capable of performing natural language processing on documents, and may be modified or configured to perform operations according to embodiments described herein. The application 105 may contain a NLP application 106 for parsing textual data and an image recognition application 107 for identifying and analyzing images. Client 110 may include an electronic document 111 with tabular data 112, such as a HTML document, which may be processed by the application 105 across the network 102 according to embodiments herein.

Figure 2:
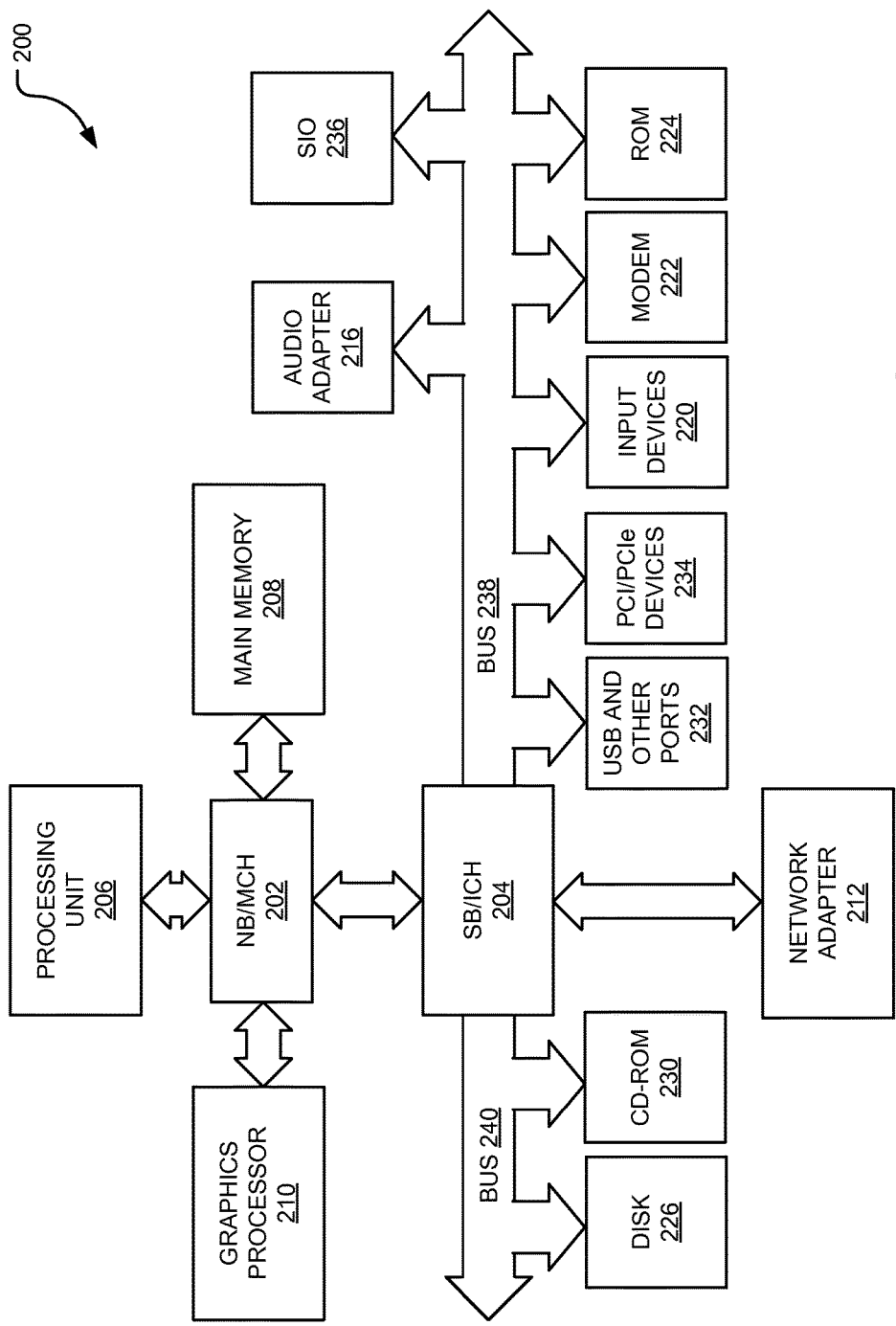
FIG. 2 depicts a block diagram of a data processing system in which various embodiments may be implemented.

Referring now to FIG. 2, a block diagram of a data processing system may be seen in which embodiments may be implemented. Data processing system 200 may be a computer, such as server 103, 104 or client 110, 112, 114, as seen in FIG. 1, or another type of suitable device in which computer usable program code or instructions implementing the processes may be located. In the depicted example, data processing system 200 employs a hub architecture including North Bridge and memory controller hub (NB/MCH) 202 and South Bridge and input/output (I/O) controller hub (SB/ICH) 204. However the architecture employed in FIG. 2 is intended as an example, and not as an architectural limitation for the different illustrative embodiments.

Processing unit 206, main memory 208, and graphics processor 210 may be coupled to NB/MCH 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain embodiments.

In the depicted example, local area network (LAN) adapter 212 is coupled to South SB/ICH 204. Audio adapter 216, input devices 220, modem 222, read only memory (ROM) 224, universal serial bus (USB) and other ports 232, and PCI/PCIe devices 234 are coupled to SB/ICH 204 through bus 238. Hard disk drive (HDD) 226 and CD-ROM 230 are coupled to SB/ICH 204 through bus 240. PCI/PCIe devices 234 may include, for example, Ethernet adapters, add-in cards, PC cards for notebook computers, and other suitable devices. ROM 224 may be, for example, a flash binary input/output system (BIOS). HDD 226 and CD-ROM 230 may use, for example, an integrated drive electronics (IDE) or serial advanced technology attachment (SATA) interface. A super I/O (SIO) device 236 may be coupled to SB/ICH 204 through bus 238. The buses 238, 240 may comprise one or more buses, such as a system bus, an I/O bus, and a PCI bus. The buses 238, 240, may be implemented using any type of suitable communications fabric or architecture that provides for a transfer of data between different components or devices attached to the fabric or architecture.

Main memory 208 may include a random-access semiconductor memory, storage device, or storage medium (either volatile or non-volatile) for storing or encoding data and programs. In an embodiment, the main memory 208 may represent the entire virtual memory of the data processing system 200, and may also include the virtual memory of other computer systems coupled to the data processing system 200. The main memory 208 may be conceptually a single monolithic entity. In certain embodiments the main memory 208 may be a more complex arrangement, such as a hierarchy of caches and other memory devices.

Memory devices, such as main memory 208, ROM 224 may be computer usable storage mediums are some examples of computer usable storage devices. HDD 226, CD-ROM 230, and other similarly usable devices are some examples of computer usable storage devices including computer usable storage medium.

An operating system may run on processing unit 206. The operating system may coordinate and provide control of various components within data processing system 200. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), or other suitable operating system. An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, may be located on one or more storage devices, such as HDD 226, and may be loaded into at least two distinct categories of one or more memories, such as main memory 208, for execution by processing unit 206. The processes of the embodiments may be performed by processing unit 206 using computer implemented instructions, which may be located in a memory, such as for example, main memory 208, ROM 224, or in one or more peripheral devices.

The hardware in FIGS. 1 and 2 may vary depending on the implementation. Other internal hardware or peripheral devices, such as flash memory, equivalent non-volatile memory, optical disk drives, or other suitable devices, may be used in addition to or in place of the hardware depicted in FIGS. 1 and 2. In addition, the processes of the illustrative embodiments may be applied to a multiprocessor data processing system. The depicted examples in FIGS. 1 and 2 are not meant to imply architectural limitations. For example, data processing system 200 also may be a tablet computer, laptop computer, smart phone, PDA, or other suitable computing device.

Referring now to FIG. 3, an example of tabular data may be seen which may be transformed into a language section according to embodiments of the disclosure. Table 300 may be an example of tabular data 112 (FIG. 1). Table 300 may be tabular data which appears in electronic document 111 stored in client 110 and may be transformed into a language section using application 105 as seen in FIG. 1.

The table 300 includes one or more cells. The one or more cells may be identified with a set of categories used to organize data in the table and to create contextual relationships between the cells. The set of categories may include headers, labels and content cells. The headers may be cells which modify (create contextual relationship with) labels and content cells. The labels may be cells which modify content cells. The content cells may be modified by both the labels and the headers.

The headers and labels may be associated with the table's rows and columns. For example, the headers may be either row headers or column headers, and the labels may be either row labels or column labels. As an example of this structure, table 300 contains row labels 306, 308, 310 and column labels 312, 314, 316. The row labels, such as row label 306, may have content which is modified by the row header 304. Content cell 320 may have content which is a modified by the row label 306 and the column label 312.

Determining whether a cell in a table 300 is a header, label, or a content cell, may depend on the position of the cell in the table and what the cell modifies. For example, headers directly modify labels and indirectly modify content cells. Labels may directly modify content cells. Content cells may not modify anything in the table 300. As seen in FIG. 3, the table 300 may have a row header 304, which based on its position in the table 300, identifies the context of content in the series of rows (306, 308, and 310) beneath the row header 304. Row labels 306, 308, 310 and column labels 312, 314, 316 may, based on their positions in the table, identify the context of cells beneath column labels 312, 314, 316 and to the right of row labels 306, 308, 310. Content cells 320-336 may, based on their positions, not modify other cells of the table 300.

Because content cells 320-336 do not modify other cells of the table 300, they may be identified as content cells. Because row labels 306, 308, 310 and column labels 312, 314, 316 directly modify content cells 320-336, they may be identified as row labels and column labels respectively. Because row header 304 directly modifies the row labels 306, 308, 310 and indirectly modifies content cells 320-336, it may be identified as a row header.

Cells in table 300 may each have content which may communicate the purpose of the cell and give information to a reader which may be modified by other cells in the table, as described herein. The content may be characterized as numbers, letters, one or more words, one or more sentences, images or other type of content. The characteristics of the content may be determined in order to properly format language sections constructed from the cells in table 300. For example, a section title for a language section may be constructed from a column label and a row label. The format of the section title may depend on the content characteristic of each of the column label and the row label. For example, in embodiments the column label may be emphasized in the section title when the content characteristic of the column label is one or more sentences and the content characteristic of the row label is one or more words. In embodiments, when both the column label and the row label have content characteristic of one or more sentences, both the column label and row label may be equally emphasized in the section title. In certain embodiments, additional types of content characteristics may also be determined including numbers, video, or other types of content.

In embodiments, the content characteristic of a cell in table 300 may be determined by using known NLP techniques to determine whether the content characteristic is one or more sentences or one or more words. For example, known English parsing applications may detect language data in the cell and parse the content to determine whether the language data contains a subject, object, and predicate. If the language data contains a subject, object and predicate, the English parsing application may determine that the language data is one or more sentences. Otherwise, the English parsing application may determine that the language data is one or more words.

In certain embodiments, known image analysis and recognition techniques may be used to determine whether the content characteristic is one or more images. For example, a known image analysis and recognition application may detect image data in the cell and analyze the image content. For example, known image analysis and recognition applications may detect a file extension to determine whether data in the cell is an image (e.g., .jpg or .png). An image analysis application can be used to determine whether the image contains alphanumeric characters. In response to determining that the image contains alphanumeric characters, any of various known image recognition applications may be used to generate text from the portion of the image appearing as text. For example, optical character recognition techniques may be used to identify and extract text from the image, and the text may be parsed from the image data into a language section. In addition, an image analysis application can be used to determine whether the image contains a representation of an object. Examples of objects include, but are not limited to, icons, symbols, product logos, mathematical symbols, and computer graphic-type symbols, such as icons for trash or storage. In response to determining that the image contains a representation of an object, an image recognition application may be used to compare the image with a list of images stored in a memory. The comparison may include pattern matching and the like. The application may determine whether the image data is similar to images in the image list. Each image in the memory may have associated text also stored in the memory. This text may describe the object. In addition, similarity of images may be identified using known techniques such as content based image retrieval system techniques, techniques using metadata associated with the image (such as the file name), or other suitable techniques. Accordingly, text can be generated from a representation of text in an image or from a representation of an object in an image. In various embodiments, text generated from an image using any such technique can be used to generate a language section.

The table 300 may also have a table caption 302. The table caption 302 may provide introductory information to the table 300 such as the title of the table, contextual information for the table 300 and other information. The table caption 302 may include some or all of the data in the document which is located outside of the table 300. In embodiments, the table caption 302 may be included in a language section generated for the table 300. The table caption may be selected based on heuristic techniques which analyze characteristics of the table caption 302. The characteristics may include, but are not limited to, the position, font size, font type, bold lettering, italic lettering, length of content, similarity of words, dissimilarity of words, ontology, and other characteristics of the table caption 302. The characteristics of the table caption may have a table caption score generated based on the characteristics of the table caption 302. The table caption score may represent the relevance of the table caption in the language section generated from the table. Multiple table captions may be included in the document and each table caption may be analyzed and scored to determine which table caption has the highest table caption score. In embodiments, the table caption having the highest table caption score may be included in the language section generated from the table 300. In certain embodiments, table captions may be included in the language section generated using the table when the table caption score exceeds a threshold.

The table 300 may be identified by embodiments of the application 105 (FIG. 1). The table 300 may be identified by the presence of tabular data in instances of a document. For example, in embodiments, the table 300 may be identified by the presence of visual grid markings, indentations, document markup tags such as HTML tags, or a combination thereof. In certain embodiments, the table may be identified by a reference in the document which indicates that a part of document is occupied by a table 300. The application may identify headers, labels, and content cells based on positioning of cells in the table, as described herein.

The application 105 may recognize that data in row header 304, row labels 306-310, and column labels 312-316 apply to all cells in their respective rows and columns as described herein. Elsewhere in the document, other content, such as the table caption 302, may be identified based on characteristics of the table caption 302, as described herein, and used to gain contextual information about the table 300. For example, in FIG. 3, table caption 302 may be used to determine that the table 300 relates to "Relocation Policy". This contextual information may be used to generate language sections or natural language paragraphs of tabular data in table 300. For example, in certain embodiments, the table caption 302 may be used as a section title in a language section.

Figure 4A:
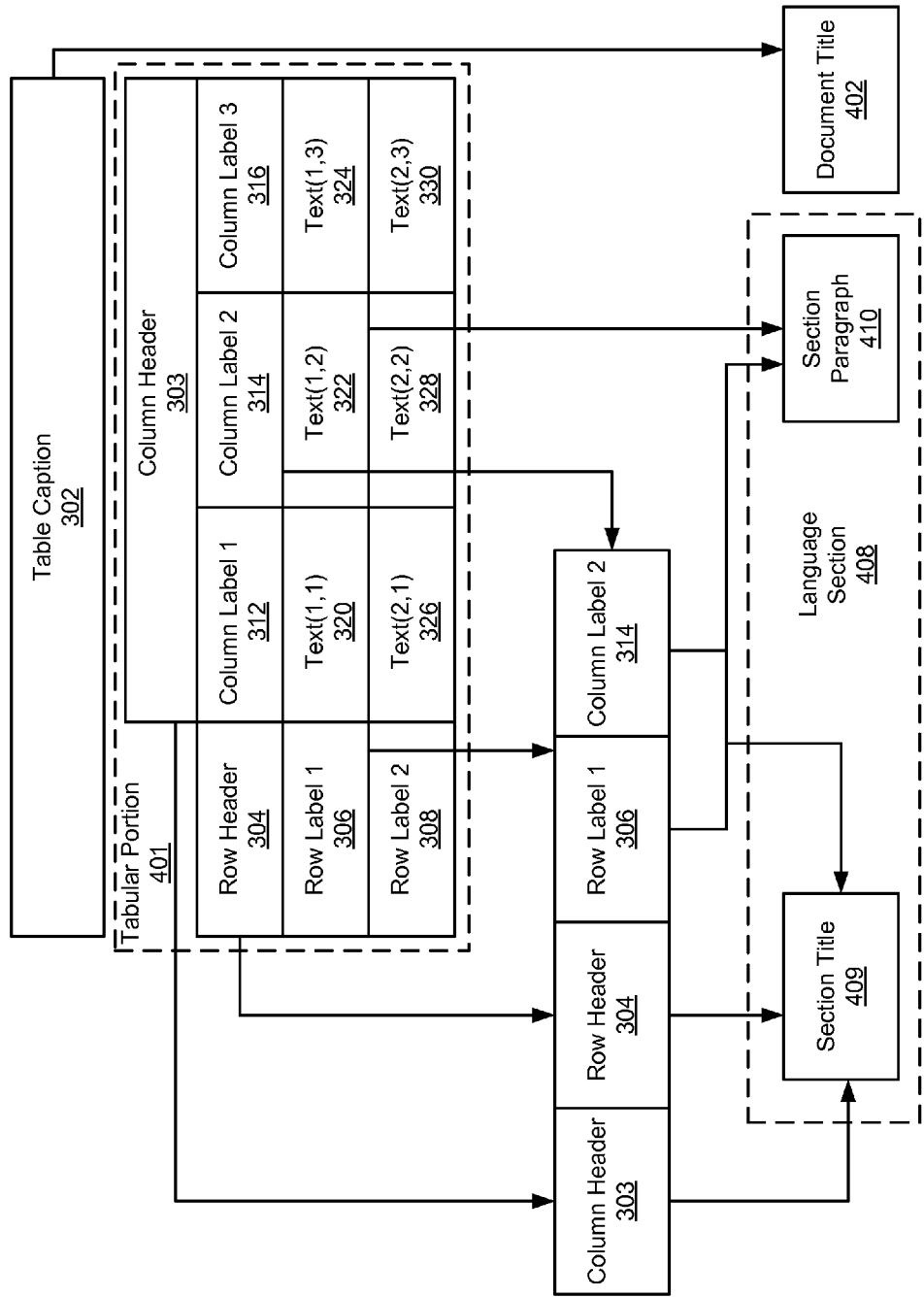
FIG. 4A depicts generation of a language section from various categories of a tabular portion of an electronic document according to embodiments of the present disclosure.

Referring now to FIG. 4A generation of a language section 408 from a tabular portion 401 may be seen according to embodiments of the present disclosure. The tabular portion 401 may be organized according to a set of categories as described herein and the language section 408 may be constructed from at least two distinct categories of the set of categories (headers, labels, content cells) as described herein. The set of categories may include column header 303, row header 304, row labels 306, 308, column labels 312-316, and content cells 320-330. The language section 408 may include a section paragraph 410 and a section title 409, as described herein.

FIG. 4A depicts a language section 408 generated from content cell 322 and the corresponding cells in the tabular portion 401 which modify content cell 322. As shown herein, the same or substantially similar process may be used for generating language sections from any of the content cells 320-330 in the tabular portion 401. In embodiments, content cell 322 may be modified by column label 314, row label 306. Further, column label 314 may be modified by column header 303, and row label 306 may be modified by row header 304. A section title 409 of the language section 408 may be constructed from at least one of the set of categories including the column header 303, row header 304, row label 306, and column label 314. A section paragraph 410 of the language section 408 may be constructed from at least one of the set of categories including the row label 306, column label 314, and the content cell 322. A document title 402 for one or more language sections, including language section 408, may be constructed from the table caption 302 as described herein.

Other or additional language sections may be constructed from at least one of the set of categories in the tabular data 401 in the same manner as described herein. For example a second language section may be generated from content cell 320 and the corresponding cells in the tabular portion 401 which modify content cell 320. As described herein, content cell 320 may be modified by column label 312, row label 306. Column label 312 may be modified by column header 303 and row label 306 may be modified by row header 304. The section title 409 for the example second language section may be constructed from at least one of the set of categories including the column header 303, row header 304, row label 306, and column label 312. Section paragraph 410 for the second language section may be constructed from at least one of the set of categories including the row label 306, column label 312, and the content cell 320.

Figure 4B:
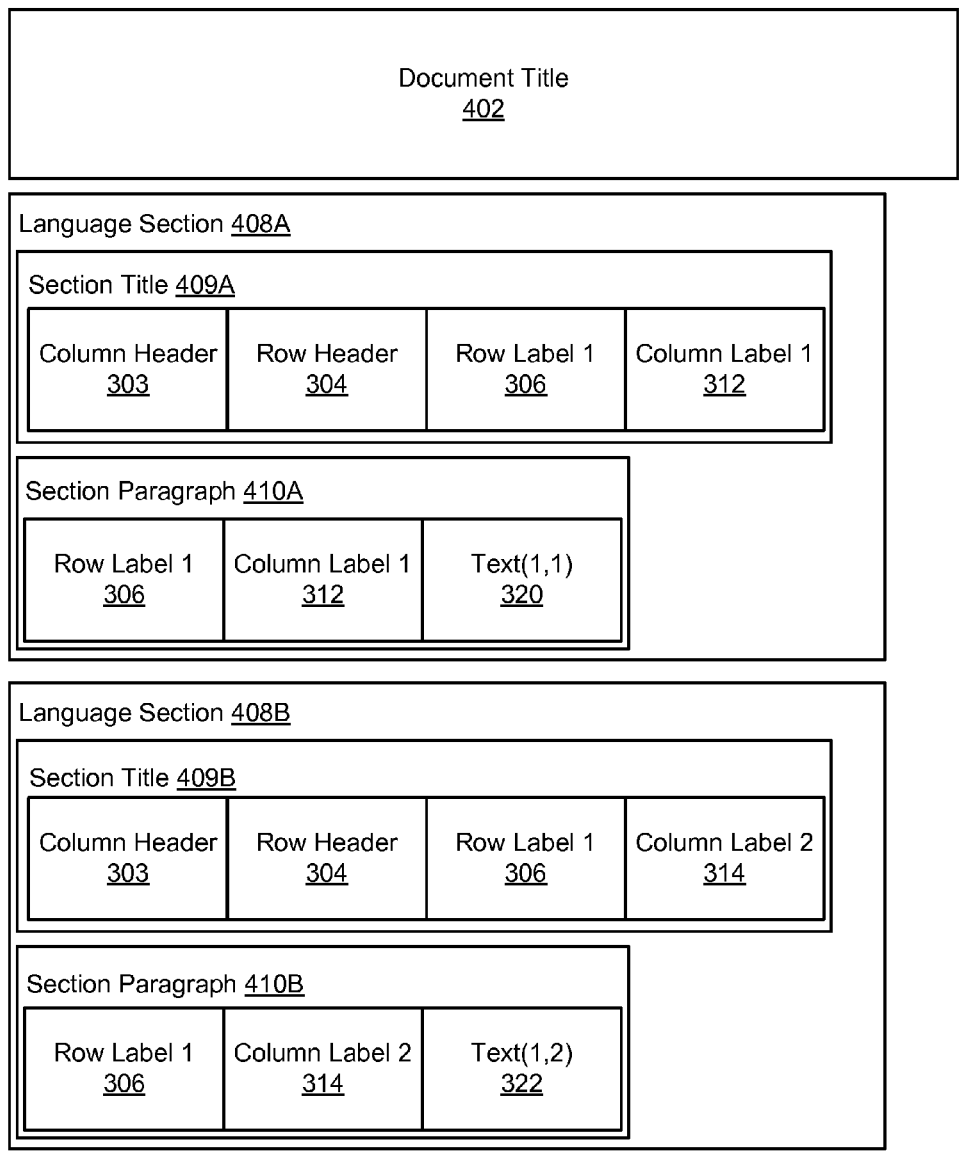
FIG. 4B depicts a first design of a language document generated according to embodiments of the present disclosure.

Referring now to FIG. 4B the design of a language document having first and second language sections 408A, 408B, constructed from a tabular portion 401 may be seen according to embodiments of the present disclosure. The document may have a document title 402 followed by a first language section 408A and a second language section 408B. Each language section 408A, 408B may include a section title 409A, 409B and a section paragraph 410A, 410B. Each section title may generally provide context contained in the headers and labels of the tabular portion from which each respective language section 408A, 408B is generated.

The first language section 408A may include a first section title 409A and a first section paragraph 410A. The first section title 409A may be constructed from at least one of the set of categories in the first tabular portion 401 including a column header 303, row header 304, row label 306, and a column label 312. The first section paragraph 410A may be constructed from a row label 306, column label 312, and content cell 320.

The second language section 408B may include a second section title 409B and a second section paragraph 410B. The second section title 409B may be constructed from the column header 303, row header 304, row label 306, and a column label 314. The second section paragraph 410B may be constructed from the row label 306, the column label 314, and a content cell 322. As may be seen in FIG. 4B, separate language sections may be constructed for each of the content cells 320 and 322 and the corresponding cells which modify content cells 320 and 322. Depending upon the content for which the language section is based, two or more language sections may contain similar content, including similar section titles and similar section paragraphs. For example, section titles 409A and 409B may each contain column header 303, row header 304, and row label 306. In certain embodiments, similar headers, labels, and content cells may be merged to reduce the size of the language document and improve readability.

Figure 4C:
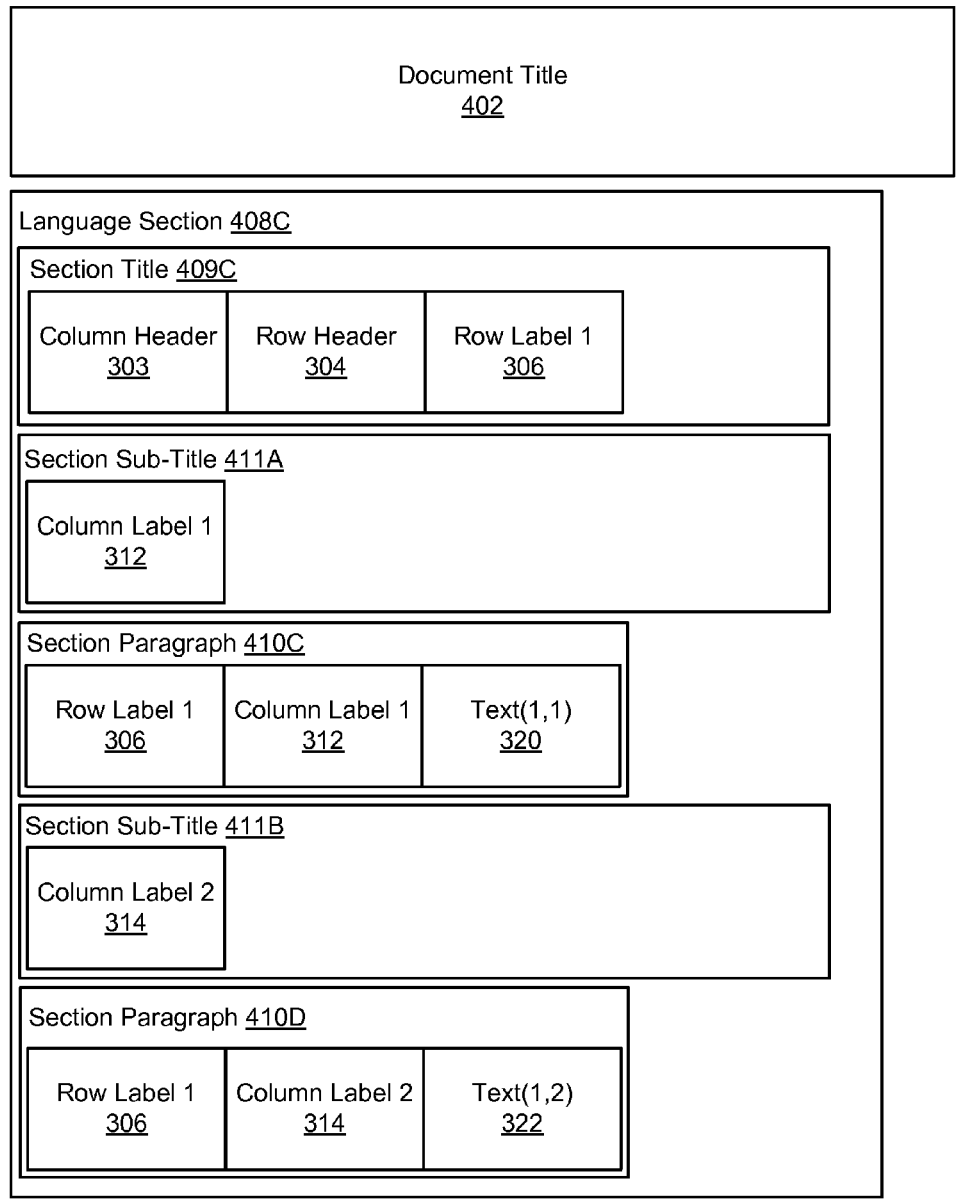
FIG. 4C depicts a second design of a language document generated according to embodiments of the present disclosure.

Referring now to FIG. 4C design for a language document having a first language section 408C, constructed from tabular portion 401 may be seen according to embodiments of the present disclosure. Language section 408C may be generated by embodiments of the present disclosure which merge similar section titles in order to improve readability and improve space efficiency of the language document. Language section 408C may be generated from both content cells 320 and 322 and the corresponding cells which modify content cells 320 and 322. Language section 408C may include section title 409C, first section sub-title 411A, second section sub-title 411B, a first section paragraph 410C, and second section paragraph 410D. Section title 409C may be constructed from at least one of the set of categories of the tabular portion 401, including the column header 303, the row header 304, and the row label 306. The first section sub-title 411A may be constructed from the column label 312. The first section paragraph 410C may be constructed from the row label 306, the column label 312 and the content cell 320. The second section subtitle 411B may be constructed from the column label 314. The second section paragraph 410D may be constructed from the row label 306, the column label 314, and the content cell 322.

The section title 409C may apply context to the first and second section sub-titles 411A, 411B, and section paragraphs 410C, 410D in the language section 408C. The section title 409C may be generated by merging similar components (column header 303, row header 304 and row label 306) which make up both first section title 409A and second section title 409B from FIG. 4B. In embodiments, similar components are two or more components which have identical text. In certain embodiments, similar components are two or more components which have identical text except for differences in one or more prepositions. In certain embodiments, similar components may be two or more components which are identical except for differences in one or more conjunctions. In certain embodiments, similar components are two or more components which have identical text except for difference in one or more grammatical marks.

The components in section title 409A and section title 409B which are not similar (column label 312 and column label 314) may be spilt into two distinct section sub-titles (first section sub-title 411A and second section subtitle 411B) which modify each of their corresponding section paragraphs (section paragraph 410C and 410D respectively). Thus, the two language sections of FIG. 4B may be merged into one language section 408C of FIG. 4C, which may improve readability of the language document, improve space efficiency, and may better organize tabular data in natural language form.

Figure 4D:
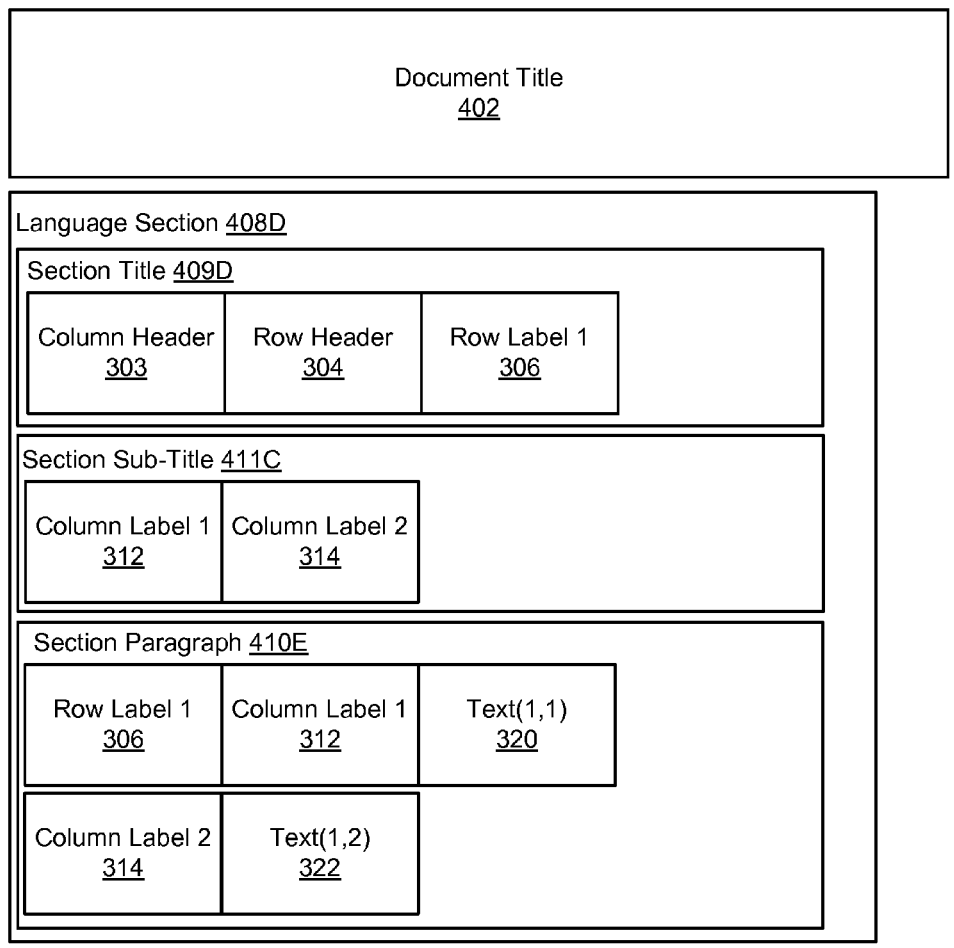
FIG. 4D depicts a third design of a language document generated according to embodiments of the present disclosure.

Referring now to FIG. 4D design for a language document having language section 408D, constructed from tabular portion 401 may be seen according to embodiments of the present disclosure. FIG. 4D may depict the design of a language section 408D for embodiments of the present disclosure which merge similar section paragraphs. The language section 408D may include a first section title 409D, a first section sub-title 411C, and a first section paragraph 410E. The section title 409D may include a column header 303, row header 304, and row label 306. The section subtitle 411C may include column labels 312, 314. The section paragraph 410E may include a row label 306, column labels 312, 314, and content cells 320 and 322.

If content cells 320 and 322 are similar, then to improve space efficiency, readability, and organization, embodiments of the present invention may merge section paragraphs, such as section paragraphs 410C and 410D in FIG. 4C, into section paragraph 408D as seen in FIG. 4D. This may avoid creating duplicate section paragraphs in the language section. Because the two or more section paragraphs from which section paragraph 408D is generated may each have their own section title or section sub-title, such as section sub-titles 411A and 411B (FIG. 4C), the section title or section sub-title for each section paragraph may be joined. Joining the section title or section sub-title may be done using natural language techniques, or other suitable techniques. In certain embodiments, joining section titles or section sub-titles includes connecting each section title or section sub-title with a conjunction. For example, a first section subtitle saying "Policy for part-time employees" and a second section sub-title saying "Policy for full-time employees" may be joined into one section sub-title saying "Policy for full-time employees and Policy for part-time employees".

Figure 4E:
FIG. 4E depicts a table of format rules for language sections generated according to embodiments of the present disclosure

Referring now to FIG. 4E, a formatting table 422 may be seen according to embodiments of the present disclosure. The formatting table 422 may include a set of formatting rules for the section titles, section sub-titles, and section paragraphs created for language sections in various embodiments. The formatting table 422 may govern the format of language sections and section titles based on content characteristics of the set of categories (headers, labels, content cells) in tabular data. The content characteristics of the set of categories may include one or more words, one or more sentences, and images, as described herein.

For example, referring to row 424, if a portion of tabular data includes a column label (CL), a row label (RL), and a content cell (CC) having a content characteristic of one or more words, then the format for a section paragraph is a sentence generated from the tabular data in the column label, row label, and content cell. Referring to row 426, if a portion of tabular data includes a column label and a row label each having a content characteristic of one or more words and a content cell having a content characteristic of one or more sentences, the format for a section paragraph is a sentence generated from the content cell. The format for a section title is a sentence generated from the column label and the row label.

Row 428 may be selected when the content characteristic for the column label is one or more sentences, the content characteristic for the row label is one or more words, and the content characteristic of the content cell is one or more sentences. Row 428 may format a section title as a sentence generated from content in the column label and row label.

Row 428 may format a section paragraph as a section generated from content in the content cell, row label, and column label. In row 428, the section title generated from column label and row label may focus on column label because the column label has a content characteristic of one or more sentences.

Application of rows 430 and 432 may operate in the same or similar manner of the other described rows.

Rows 434 and 436 may be selected when the content characteristic of at least one of the categories is an image. Rows 434 and 436 may output a sentence built from the column label, row label, and content cell using image to text conversion from the categories having the content characteristic of an image. The image to text conversion may be performed using optical character recognition techniques as described herein.

Figure 5:
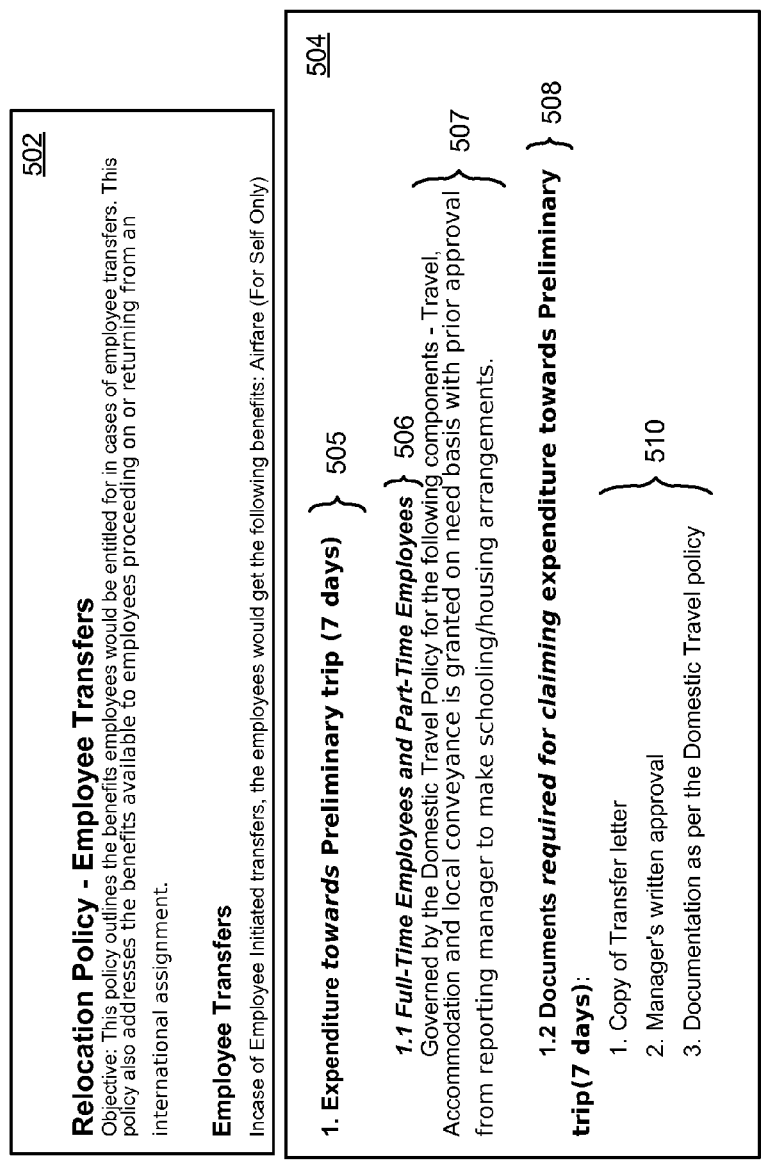
FIG. 5 depicts an example of a language section generated according to embodiments of the present disclosure

Referring now to FIG. 5 a document including a language section may be seen generated according to embodiments of the disclosure. The language section in FIG. 5 may be generated from tabular data seen in FIG. 3. The language section 504 and the document title 502, may be generated from one or more tabular portions of the table 300 (FIG. 3). The language section 504 may include section title 505, a first section sub-title 506, a first section paragraph 507, a second section sub-title 508, and a second section paragraph 510. The document title 502 may be constructed from table captions as described herein. For example language section 502 may be constructed from the table caption 302 seen in FIG. 3.

The language sections 504 may be constructed based on the format of the table 300, as described herein. For example, section title 505 may be constructed from the row header 302 and row label 306. Row header 302 and row label 306 may modify each cell in the same row in table 300. Thus, the row header and row label 306 will be identical for content cells 320, 322, 324, in table 300. Thus, as described herein, the section titles having substantially similar content may be merged into one section title 505.

Section sub-title 506 may be constructed from column header 312 and column header 314. Column headers 312, 314 are not substantially similar so they are not merged into one section title with section title 505. The content cells 320 and 322 are substantially similar, thus the content cells 320 and 322 may be merged into one section paragraph 507. Thus, the column headers 312, 314 may be joined into one section sub-title 506 which applies both column headers to the single merged section paragraph 507.

Section sub-title 508 may be constructed from column header 316, and section paragraph 316 may be constructed from content cell 324. Since content cell 324 may not be substantially similar to content cells 320 and 322, content cell 324 and column header 316 may be constructed as a section sub-title 508 and section paragraph 510.

Figure 6:
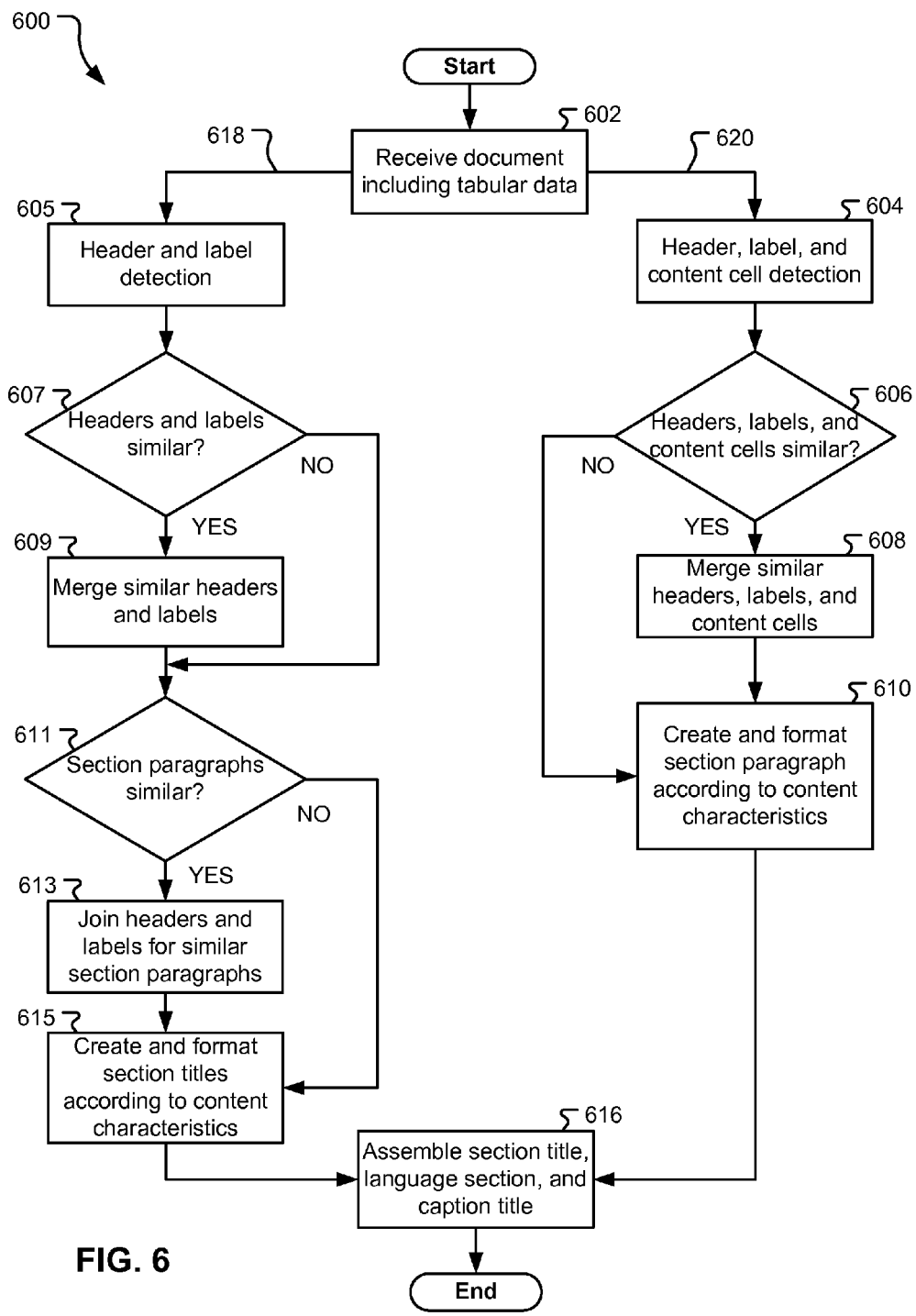
FIG. 6 depicts a flow chart diagram of a method of generating a language section according to embodiments of the present disclosure.

Referring now to FIG. 6 a flow chart diagram of a method of generating a language section may be seen according to embodiments of the present disclosure. In operation 602, a document containing tabular data may be received. The document containing tabular data may be the same or substantially similar as described herein. The tabular data in the document may also be detected using the same or substantially similar techniques as described herein. From operation 602, two paths may exist. The right path 620 (including operations 604, 606, 608, 610) may be used to construct a section paragraph. The left path 618 (including operations 605, 607, 609, 611, 613, 615) may be used to construct a section title. Both paths may be executed simultaneously or at different times.

Beginning with the right path 620, in operation 604, headers, labels, and content cells may be detected. The headers, labels, and content cells may be the same or substantially similar as described herein. They may be detected in the tabular data based on their positioning in the table, as described herein. In decision block 606, if the headers labels and content cells are substantially similar, then the method may progress to operation 608. In operation 608 substantially similar headers, labels, and content cells may be merged as described herein. If the headers and labels are not substantially similar, then in decision block 606, the method may progress to operation 610.

In operation 610, the section paragraph may be created and formatted. As described herein, the format of the section paragraph may be based on the content characteristics of the set of categories (headers, labels, content cells) used to create the section paragraph.

Beginning with the left path 618, in operation 605, headers and labels in the tabular data may be detected. The headers and labels may be the same or substantially similar as described herein. They may be detected in the tabular data based on their positioning in the table, as described herein.

In decision block 607, if the headers and labels are substantially similar, then the method may progress to operation 609. In operation 609 similar headers and labels may be merged. If the headers and labels are not substantially similar then, in decision block 607, the method 600 may progress to decision block 611.

In decision block 611, if the section paragraphs generated by the method are substantially similar, then the method may progress to operation 613. In operation 613, headers and labels for similar section paragraphs may be joined. The headers and labels may be joined according to embodiments of the present disclosure discussed herein. If the headers and labels are not substantially similar then, in decision block 611, the method 600 may progress to operation 615.

In operation 615, the section title may be created and formatted according to content characteristics of the set of categories (headers, labels, content cells) used to create the section title, as discussed herein. In operation 616, the section title and the section paragraph may combined to form the language section.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that retains and stores instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method of generating a language section from tabular data in an electronic document, the method comprising:

identifying, by a processor, in a first tabular portion of the electronic document, a set of categories used to organize tabular data, wherein the set of categories includes headers, labels, and content cells;

determining that the set of categories includes a content cell that contains an image by detecting an image file extension associated with the content cell;

identifying, by the processor and using heuristics and machine learning, contextual relationships between the tabular data, wherein the contextual relationships are created by the set of categories and the identifying is based in part on the position of each category in the set of categories in the first tabular portion and based on the tabular data that each category modifies;

identifying, by the processor, a content characteristic for each of the set of categories in the first tabular portion, wherein identifying a content characteristic for the content cell that contains an image comprises utilizing optical character recognition techniques; and generating, by the processor, a first language section from at least two distinct categories of the set of categories, wherein a format of the first language section is based on the content characteristic and contextual relationships for each of the at least two distinct categories of the set of categories and is governed by a formatting table, wherein the formatting table comprises example combinations of content characteristics for example categories of an example tabular portion and formatting rules for generating example language sections from those example combinations.

2. The method of claim 1, wherein the generating of the first language section from the at least two distinct categories of the set of categories includes generating the first language section from a column label, a row label, and a content cell, and wherein the format of the first language section is based on the content characteristic and contextual relationships of the column label, row label, and content cell.

3. The method of claim 1, wherein the first language section includes a first section title and wherein the method further comprises generating the first section title from the at least two distinct categories of the set of categories, the format of the first section title based on the content characteristic and contextual relationships for each of the at least two distinct categories of the set of categories.

4. The method of claim 3, wherein the generating of the first section title from the at least two distinct categories of the set of categories includes generating the first section title from a column label and a row label, the format of the first section title based on the content characteristic and contextual relationships of the column label and row label.

5. The method of claim 1, wherein the identifying of the content characteristic for each of the set of categories includes identifying whether each of the set of categories is one or more words, one or more sentences, or an image.

6. The method of claim 1, further comprising:
identifying, in a second tabular portion of the electronic document, a second set of categories used to organize tabular data therein;
identifying the content characteristic for each category of the second set of categories in the second tabular portion;
generating a second language section from at least two distinct categories of the second set of categories, the format of the second language section based on the content characteristic for each of the at least two distinct categories of the second set of categories; and
merging the first language section and the second language section in response to determining that the first language section is substantially similar to the second language section.

7. The method of claim 6, wherein the first language section includes a first section title and the second language section includes a second section title and wherein the method further comprises:
generating the second section title from at least two distinct categories of the second set of categories, a format of the second section title based on the content characteristics for the at least two distinct categories of the second set of categories; and
combining the first section title and the second section title in response to determining that the first language section is substantially similar to the second language section.

8. The method of claim 1, wherein the identifying the content characteristic for the cell that contains an image further comprises:
determining that the image contains a representation of an alphanumeric character;
determining that the image contains a representation of an object;
generating text from the image in response to determining that the image contains an alphanumeric character; and
determining that the representation of an object corresponds with an image stored in a memory, the image stored in the memory having associated text that describes the stored image;
and wherein the generating of the first language section from the at least two distinct categories of the set of categories further comprises:
generating the first language section from the text generated from the representation of the alphanumeric character of the image; and
generating the first language section from the text associated with the stored image that corresponds with the representation of the object of the image.

9. The computer-implemented method of claim 1, wherein the content characteristic for at least one category of the set of categories comprises the length of the content.

10. The computer-implemented method of claim 1, wherein headers provide a first context for row labels and column labels, and row labels and column labels provide a second context for content cells, and wherein the format of the first language section is further based on the first and second context.

11. The computer-implemented method of claim 1, wherein the content characteristic for each category of the set of categories comprise whether the category is associated with one or more words or one or more sentences, and wherein categories that are associated with one or more sentences are emphasized in the first language section over categories that are associated with one or more words.

12. The computer-implemented method of claim 1, wherein the row labels provide a first context to the content cells in the row in which the row label is located.

13. A computer-implemented method for generating a language section from tabular data in an electronic document, the method comprising:
identifying, by a processor, in a first tabular portion of the electronic document, a set of categories used to organize tabular data;
identifying, by the processor, contextual relationships between the tabular data, wherein the contextual relationships are created by the set of categories and the identifying is based in part on the position of each category in the set of categories in the first tabular portion and based on the tabular data that each category modifies;
identifying, by the processor, a content characteristic for each of the set of categories in the first tabular portion; and
generating, by the processor, a first language section from at least two distinct categories of the set of categories, wherein a format of the first language section is based on the content characteristic and contextual relationships for each of the at least two distinct categories of the set of categories and is governed by a formatting table, wherein the formatting table comprises example combinations of content characteristics for example categories of an example tabular portion and formatting rules for generating example language sections from those example combinations.

14. The method of claim 13, wherein the set of categories includes headers, labels, and content cells.

* * * * *